United States Patent
Pegley et al.

(10) Patent No.: US 12,441,389 B1
(45) Date of Patent: Oct. 14, 2025

(54) RAKE BRACKET COUPLING ASSEMBLY FOR STEERING COLUMN

(71) Applicant: Steering Solutions IP Holding Corporation, Saginaw, MI (US)

(72) Inventors: Justin M. Pegley, Birch Run, MI (US); Joseph A. Beck, Bay City, MI (US); Gregory D. Brzezinski, Freeland, MI (US); Jason L. Myers, Mt. Morris, MI (US); Jacob A. Caverly, Freeland, MI (US); Scott A. Stinebring, Auburn, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 18/817,900

(22) Filed: Aug. 28, 2024

(51) Int. Cl.
*B62D 1/189* (2006.01)
*F16C 17/02* (2006.01)

(52) U.S. Cl.
CPC .............. *B62D 1/189* (2013.01); *F16C 17/02* (2013.01); *F16C 2326/01* (2013.01)

(58) Field of Classification Search
CPC ...................................................... B62D 1/184
See application file for complete search history.

(56) References Cited

U.S. PATENT DOCUMENTS

| | | | | |
|---|---|---|---|---|
| 5,390,955 A * | 2/1995 | Kaliszewski | .......... | B62D 1/195 74/492 |
| 6,616,185 B2 * | 9/2003 | Manwaring | ............ | B62D 1/184 280/775 |
| 7,861,615 B2 * | 1/2011 | Harris | ..................... | B62D 1/184 280/775 |
| 9,290,197 B2 * | 3/2016 | Kern | ....................... | B62D 1/187 |
| 10,023,223 B2 * | 7/2018 | Anspaugh | .............. | B62D 1/195 |
| 10,995,792 B1 * | 5/2021 | Ge | ........... | F16C 33/08 |
| 11,267,502 B1 * | 3/2022 | Rouleau | ................. | B62D 1/187 |
| 11,866,092 B1 * | 1/2024 | Su | .......... | B62D 1/187 |
| 2002/0171235 A1 * | 11/2002 | Riefe | .................... | B62D 1/195 280/775 |
| 2021/0129889 A1 * | 5/2021 | Bodtker | ................. | B62D 1/184 |
| 2021/0276608 A1 * | 9/2021 | Dubay | .................. | B62D 1/184 |
| 2022/0009543 A1 * | 1/2022 | Wu | ........ | B62D 1/184 |
| 2023/0402828 A1 * | 12/2023 | Laflamme | ................ | H02G 3/22 |

FOREIGN PATENT DOCUMENTS

| | | | | |
|---|---|---|---|---|
| EP | 1093990 A2 * | 4/2001 | ............. | B62D 1/184 |
| EP | 1375296 A1 * | 1/2004 | ............. | B62D 1/184 |
| FR | 3090550 A3 * | 6/2020 | | |
| JP | 2008222050 A * | 9/2008 | | |
| JP | 7345737 B2 * | 9/2023 | ............. | B62D 1/185 |
| KR | 102151218 B1 * | 9/2020 | | |
| WO | WO-2019203447 A1 * | 10/2019 | ............. | B62D 1/184 |

* cited by examiner

*Primary Examiner* — Nicole T Verley
(74) *Attorney, Agent, or Firm* — Dickinson Wright PLLC

(57) ABSTRACT

A bushing for a steering column rake bracket assembly includes a flange portion. The bushing also includes a tubular segment having an inner wall defining a central hole and an outer wall. The outer wall of the tubular segment includes a first flat outer surface. The outer wall also includes a second flat outer surface. The outer wall further includes a first curved end surface connecting the first flat outer surface and the second flat outer surface. The outer wall yet further includes a second curved end surface connecting the first flat outer surface and the second flat outer surface.

13 Claims, 4 Drawing Sheets

RAKE BRACKET COUPLING ASSEMBLY FOR STEERING COLUMN

FIELD OF TECHNOLOGY

The present disclosure relates to an adjustable steering column assembly having a rake bracket coupling assembly.

BACKGROUND

Steering column assemblies are provided with features which enable the steering column assembly to be raised or lowered (e.g. rake movement) as well as translated in and out relative to an operator of the vehicle. These features require significant packaging space to accommodate adjustment of the steering column assembly. Furthermore, these features may employ multiple components that require staking, welding, or other processes to couple the components together.

SUMMARY OF THE DISCLOSURE

According to one aspect of the disclosure, a steering column assembly includes a lower jacket arranged to slidably receive an upper jacket along a steering column axis, wherein the lower jacket defines a rake bolt passage extending through a first side of the lower jacket and a second side of the lower jacket, wherein the rake bolt passage extends transfer to the steering column axis. The steering column assembly also includes a rake bracket coupling assembly arranged to facilitate movement of the lower jacket about a pivot axis that is disposed transverse to the steering column axis. The rake bracket coupling assembly includes a rake bracket located on the first side of the lower jacket. The rake bracket coupling assembly also includes a first rake bushing disposed between the rake bracket and the lower jacket. The rake bracket coupling assembly further includes a rake plate located on the second side of the lower jacket. The rake bracket coupling assembly yet further includes a second rake bushing disposed between the rake plate and the lower jacket, wherein each of the first rake bushing and the second rake bushing comprises a flange portion and a tubular segment extending from the flange portion, wherein the tubular segment extends into the rake bolt passage of the lower jacket.

According to another aspect of the disclosure, a bushing for a steering column rake bracket assembly includes a flange portion. The bushing also includes a tubular segment having an inner wall defining a central hole and an outer wall. The outer wall of the tubular segment includes a first flat outer surface. The outer wall also includes a second flat outer surface. The outer wall further includes a first curved end surface connecting the first flat outer surface and the second flat outer surface. The outer wall yet further includes a second curved end surface connecting the first flat outer surface and the second flat outer surface.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following discussion is directed to various embodiments of the disclosure. The embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
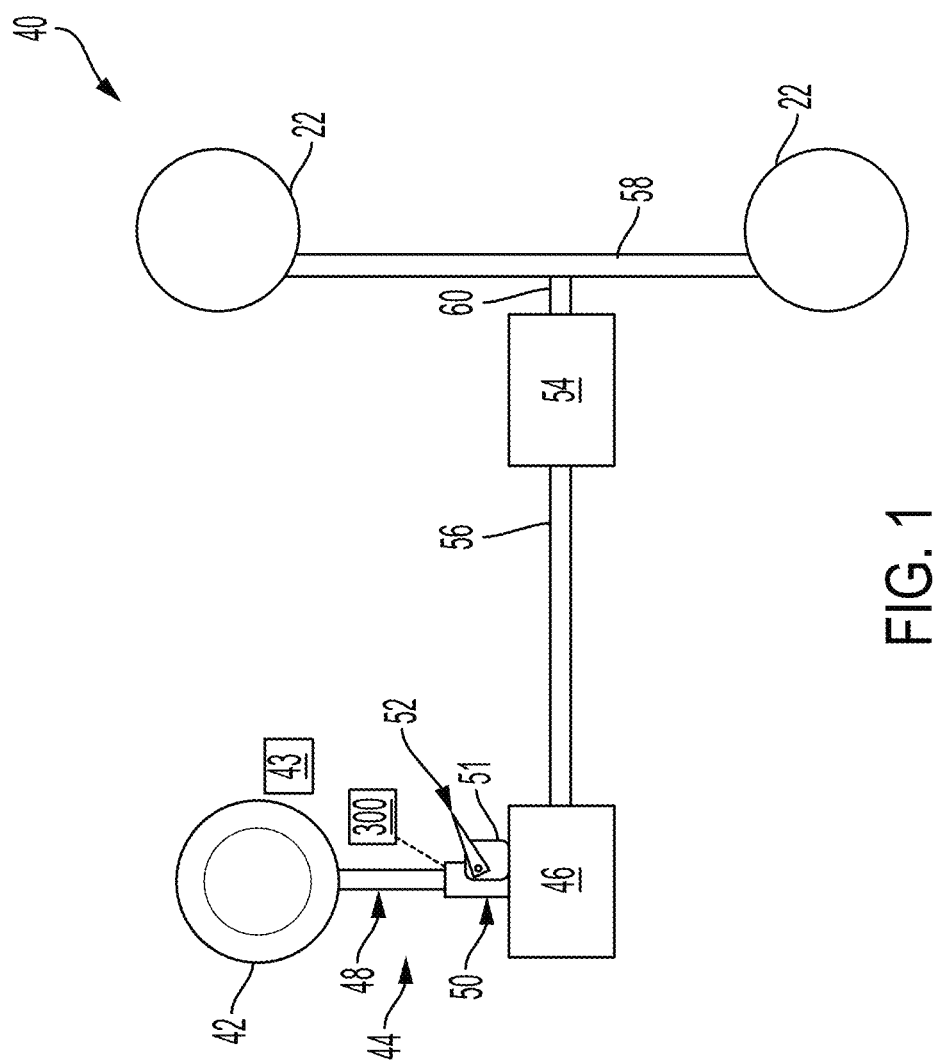
FIG. 1 is a schematic illustration of a steering system.

Referring to FIG. 1, a steering column assembly 40 for a vehicle is generally illustrated according to the principles of the present disclosure. The vehicle may include any suitable vehicle, such as a car, a truck, a sport utility vehicle, a mini-van, a crossover, any other passenger vehicle, any suitable commercial vehicle, or any other suitable vehicle. Moreover, principles of the present disclosure may apply to other vehicles, such as aircrafts, boats, trains, drones, or other vehicles.

The steering column assembly 40 may be configured as a driver interface steering system, an autonomous driving system, or a system that allows for both driver interface and autonomous steering. The steering column assembly 40 may include an input device 42, such as a steering wheel, wherein a driver may mechanically provide a steering input by turning the steering wheel. An airbag device 43 may be located on or near the input device 42. A steering column assembly 44 extends along an axis from the input device 42 to an output assembly 46. The output assembly 46 may include a pinion shaft assembly, an I-shaft, a cardan joint, steer-by-wire components or any other features conventionally located opposite the input device 42. The steering column assembly 44 may include at least two axially adjustable parts, for example, a first jacket 48 and a second jacket 50 that are axially adjustable with respect to one another. The first jacket 48 and the second jacket 50 may be alternatively configured as brackets, rails, or other members that permit axial movement therebetween. The axial movement may include sliding, telescopic, translating, and other axial movements. The steering column assembly 44 may include a bracket 51 that at least partially connects the steering column to the vehicle 10. An adjustable lever 52 may be operably connected to one of the first jacket 48, the second jacket 50, or the bracket 51 to facilitate axial or tilting adjustment of the steering column assembly 44. In some embodiments, behavior of the adjustable lever 52 may be controlled via a control system 300 including a CPU unit. In some embodiments, behavior of the adjustable lever 52 may be controlled manually.

The steering column assembly 44 is moveable over a range of positions from an extended position to a retracted position. While it is contemplated that the second jacket 50 may be axially adjustable, the first jacket 48 is axially adjustable relative to the second jacket 50 to at least partially define the extended and retracted positions of the steering column assembly 44. For example, the first jacket 48 may be referred to as an "upper jacket" and the second jacket 50 may be referred to as a "lower jacket".

A steering gear assembly 54 may connect to the output assembly 46 via a steering gear input shaft 56. The steering gear assembly 54 may be configured as a rack-and-pinion, a recirculating ball-type steering gear, or any other types of steering gears associated with autonomous and driver-interface steering systems. The steering gear assembly 54 may then connect to a translating member 58 via an output shaft 60. The output shaft 60 may include a pitman arm and sector gear or other traditional components. The output shaft 60 is operably connected to the steering gear assembly 54 such that a rotation of the steering gear input shaft 56 causes a responsive movement of the output shaft 60 and causes the translating member 58 to turn the wheels 22. In other embodiments, the steering column assembly 44 is not directly mechanically connected to the steering gear assembly 54. Such an embodiment may be referred to as a steer-by-wire system.

Figure 2:
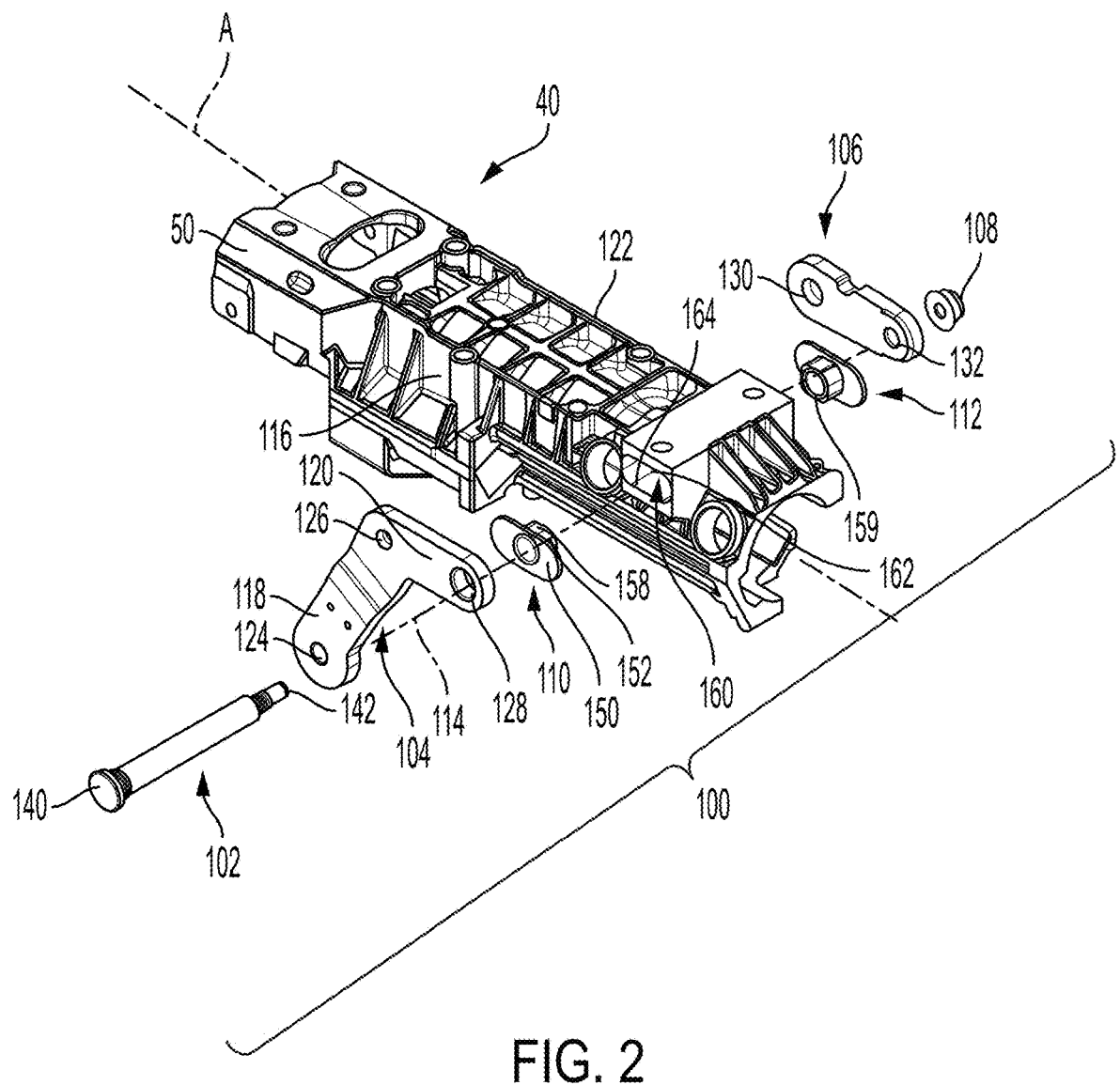
FIG. 2 is a perspective, disassembled view of the steering system having a rake bracket coupling assembly.

Referring to FIG. 2, a portion of the steering column assembly 40 is shown in a disassembled view. In particular, the lower jacket 50 is shown with a rake bracket coupling assembly 100 disassembled therefrom. The rake bracket coupling assembly 100 includes a rake bolt 102, a rake bracket 104, a rake plate 106, a retaining nut 108, a first rake bushing 110 and a second rake bushing 112. As shown, the rake bracket 104 and the rake plate 106 are not an integrally formed piece, as they are two separate components disposed on opposing sides of the lower jacket 50. Accordingly, the rake bracket structure does not extend on a top or bottom side of the lower jacket 50.

A mounting bracket or other structure (not shown) connected to the vehicle body extends across the lower jacket 50 and is operatively coupled to the lower jacket 50 through the rake bracket coupling assembly 100. The rake bracket coupling assembly 100 is operatively coupled to the mounting bracket and the lower jacket 50. The rake bracket coupling assembly 100 is arranged to facilitate movement of the lower jacket 50 about a pivot axis which is disposed substantially transverse to the steering column axis A and is disposed substantially parallel to a first axis 114.

The rake bracket 104 is located on a first side 116 of the lower jacket 50 and is operatively coupled to the mounting bracket via a pin, bolt or any other suitable fastener. The rake bracket 104 is substantially L-shaped in some embodiments, with a first segment 118 and a second segment 120. The rake plate 106 is located on a second side 122 of the lower jacket 50 and is operatively coupled to the mounting bracket via a pin, bolt or any other suitable fastener. The rake plate 106 has a generally oval or rectangular shape in some embodiments. Although illustrated with the rake bracket 104 located on the first side 116 of the lower jacket 50 and the rake plate 106 located on the second side 122 of the lower jacket 50, it is to be understood that reversal of these locations may be present in some embodiments.

The rake bracket 104 defines a first hole 124, a second hole 126 and a third hole 128. The first hole 124 extends through the first segment 118 and is configured to receive therethrough a driving member (not shown) which is part of a rake actuator. The second hole 126 extends through the intersection of the first segment 118 and the second segment 120 and is configured to receive the member which couples the rake bracket 104 to the mounting bracket. The third hole 128 extends through the second segment 120 and is configured to receive the rake bolt 102 therethrough. The rake plate 106 defines a first plate hole 130 and a second plate hole 132. The first plate hole 130 is configured to receive the member which couples the rake plate 106 to the mounting bracket. The second plate hole 132 is configured to receive the rake bolt 102 therethrough.

The rake bolt 102 extends from a first end 140 to a second end 142. The first end 140 may include a bolt head which has a larger diameter than the remainder of the rake bolt 102. The second end 142 may have a smaller diameter than the remainder of the rake bolt 102. A region extending from the second end 142 is threaded to receive the retaining nut 108 thereon. In the illustrated embodiment, the retaining nut 108 includes and inner threading and is secured to an outer threading of the rake bolt 102.

Figure 3:
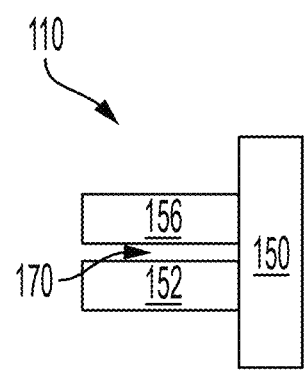
FIG. 3 is an elevation, side view of a bearing of the rake bracket coupling assembly.
Figure 4:
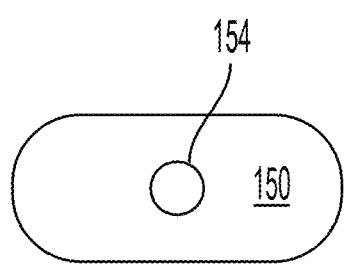
FIG. 4 is a first end view of the bearing.
Figure 5:
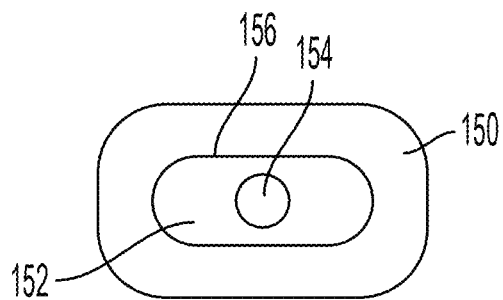
FIG. 5 is a second end view of the bearing.

FIGS. 3-5 illustrate the first rake bushing 110 and the second rake bushing 112 in additional detail. With reference to these figures, as well as continued reference to FIG. 2, the each rake bushing 110, 112, includes a flange portion 150 and a tubular segment 152 extending from the flange portion 150. The flange portion 150 and the tubular segment 152 define a central hole 154. The tubular segment 152 includes a radially outer surface 156. The radially outer surface 156 includes a first side flat surface 158 and a second side flat surface 159 (FIG. 2). The first side flat surface 158 and the second side flat surface 159 are generally parallel to each other in the illustrated embodiment, but slight variation may be present in other embodiments.

The lower jacket 50 includes a rake bolt passage 160 extending therethrough from the first side 116 to the second side 122 of the lower jacket 50. The tubular segment 152 of the first rake bushing 110 is inserted into the rake bolt passage 160 on the first side 116 of the lower jacket 50. The tubular segment 152 of the second rake bushing 112 is inserted into the rake bolt passage 160 on the second side 122 of the lower jacket 50. The portions of the rake bolt passage 160 which receive the tubular segments 152 of the rake bushings 110, 112 are oval shaped to have a pair of flat portions 162, 164 corresponding to the flat surfaces 158, 159 of the rake bushings 110, 112.

The axis which the rake bolt 102 extends and rotates about is the first axis 114. The first axis 114 extends through the third hole 128 of the rake bracket 104, the central holes 154 of the rake bushings 110, 112, the rake bolt passage 160 of the lower jacket 50, and the second plate hole 132 of the rake plate 106.

Figure 6:
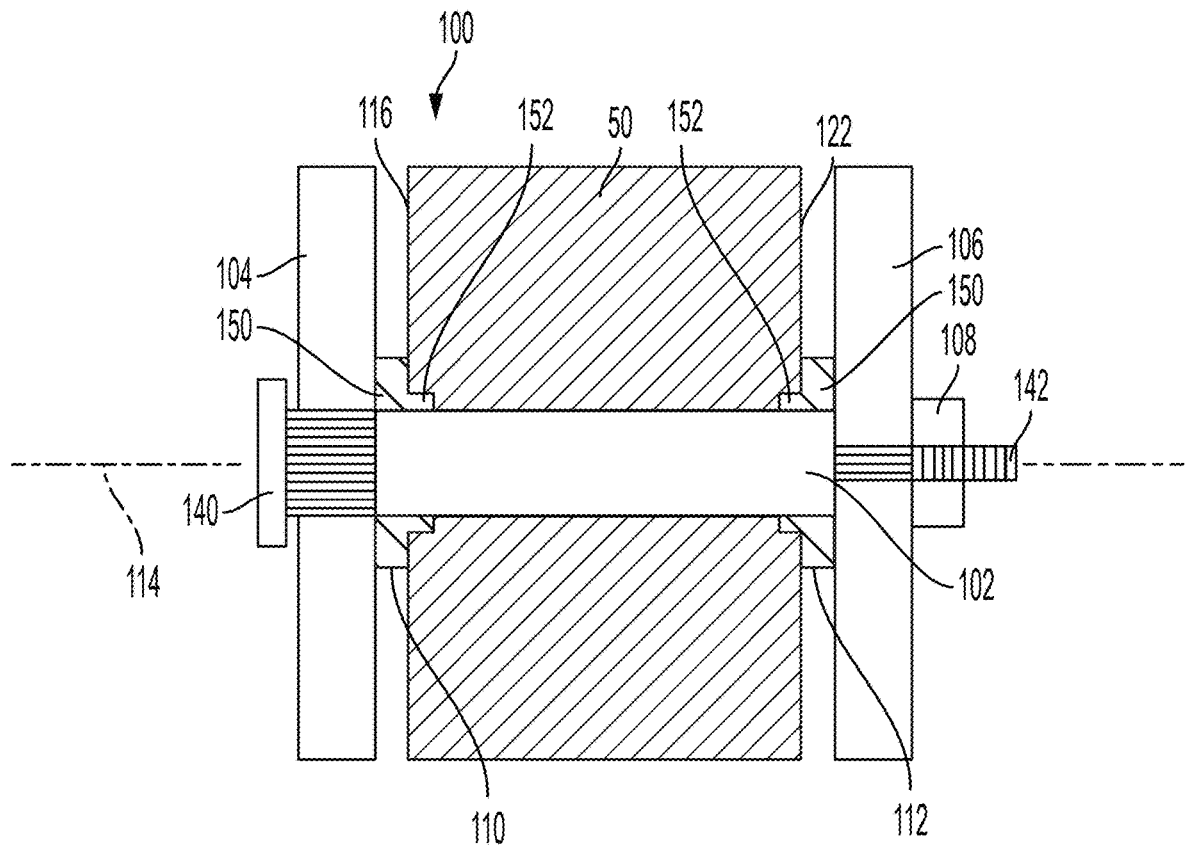
FIG. 6 is a cross-sectional view of the rake bracket coupling assembly in an assembled condition.

FIG. 6 is a cross-sectional view of an assembled condition of the above-described components. In particular, the rake bushings 110, 112 are shown with their respective tubular segments 152 inserted within the rake bolt passage 160 of the lower jacket 50. Additionally, the rake bolt 102 is shown extending through the third hole 128 of the rake bracket 104, the central hole 154 of the first rake bushing 110, the rake bolt passage 160 of the lower jacket 50, the central hole 154 of the second rake bushing 112 and the second hole 132 of the rake plate 106. Additionally, the retaining nut 108 is secured to the second end 142 of the rake bolt 102.

In some embodiments, the rake bushings 110, 112 are formed of a deformable material, such as plastic, for example. Slight deformation of the rake bushings 110, 112 during assembly accounts for component size variation due to manufacturing processes. The rake bushings 110, 112 have a split hole 170 at the pin interface (FIG. 3) to allow for deformation during insertion of the rake bolt 102 and/or during insertion of the rake bushings 110, 112 into the rake bolt passage 160 of the lower jacket 50. The inner wall defining the central hole 154 is not continuous in some embodiments to define the split hole 170.

As shown in the assembled condition, the rake bushings 110, 112 contact the outer diameter of the rake bolt 102 with the inner wall which defines the central hole 154, as well as the lower jacket 50. The flat surfaces 158, 159 of the rake bushings 110, 112 contact the flat portions 162, 164 of the rake bolt passage 160 to eliminate radial and/or vertical clearance therebetween.

The flange portion 150 of the first rake bushing 110 is laterally clamped between the rake bracket 104 and the first side 116 of the lower jacket 50, while the flange portion 150 of the second rake bushing 112 is laterally clamped between the rake plate 106 and the second side 122 of the lower jacket 50 to eliminate lateral clearance.

The rake bolt 102, the rake bracket 104, and the rake plate 106 rotate about the longitudinal axis of the rake bolt 102, relative to the rake bushings 110, 112, and the lower jacket 50, during rake motion operation. The rake bolt 102, rake bracket 104 and the rake plate 106 rotate with each other due to a splined connection or other mechanical connection. Additionally, the rake bushings 110, 112 slide fore and aft within the rake bolt passage 160 during rake motion operation, with clearance in these directions provided between the rake bushings 110, 112 and the end walls of the rake bolt passage 160.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
    a lower jacket arranged to slidably receive an upper jacket along a steering column axis, wherein the lower jacket defines a rake bolt passage extending through a first side of the lower jacket and a second side of the lower jacket, wherein the rake bolt passage extends transversely to the steering column axis; and
    a rake bracket coupling assembly arranged to facilitate movement of the lower jacket about a pivot axis that is disposed transverse to the steering column axis, the rake bracket coupling assembly comprising:
        a rake bracket located on the first side of the lower jacket;
        a first rake bushing disposed between the rake bracket and the lower jacket;
        a rake plate located on the second side of the lower jacket; and
        a second rake bushing disposed between the rake plate and the lower jacket, wherein each of the first rake bushing and the second rake bushing comprises a flange portion and a tubular segment extending from the flange portion, wherein the tubular segment extends into the rake bolt passage of the lower jacket, wherein the tubular segment of each rake bushing includes an outer wall having a first flat outer surface and a second flat outer surface, wherein the first flat outer surface and the second flat outer surface are parallel to each other, wherein the outer wall of the tubular segment of each rake bushing comprises:
            a first curved end surface connecting the first flat outer surface and the second flat outer surface; and
            a second curved end surface connecting the first flat outer surface and the second flat outer surface.

2. The steering column assembly of claim 1, wherein the rake bracket and the rake plate do not extend along a top side or a bottom side of the lower jacket.

3. The steering column assembly of claim 1, wherein the first rake bushing and the second rake bushing are each formed of a material which expands when compressed during assembly.

4. The steering column assembly of claim 3, wherein the first rake bushing and the second rake bushing are each formed of plastic.

5. The steering column assembly of claim 1, wherein further comprising a rake bolt, wherein the rake bolt extends through a hole defined by the rake bracket and through a hole defined by the rake plate.

6. The steering column assembly of claim 5, wherein the rake bolt includes splines on an outer surface thereof, the splines engaged with corresponding splines on a wall defining the hole of the rake bracket and corresponding splines on a wall defining the hole of the rake plate.

7. The steering column assembly of claim 1, wherein the first curved end surface and the second curved end surface are positioned within the rake bolt passage to have a clearance between each curved end surface and end walls of the rake bolt passage to allow fore and aft movement of the rake bushings during operation.

8. The steering column assembly of claim 1, wherein the flange portion extends radially outward further than an outer wall of the tubular segment.

9. The steering column assembly of claim 1, wherein the tubular segment is not continuous to define at least one split section of the tubular segment.

10. A bushing for a steering column rake bracket assembly comprising:
    a flange portion;
    a tubular segment having an inner wall defining a central hole and an outer wall, the outer wall of the tubular segment comprising:
        a first flat outer surface;
        a second flat outer surface that is parallel to the first flat outer surface;
        a first curved end surface connecting the first flat outer surface and the second flat outer surface; and
        a second curved end surface connecting the first flat outer surface and the second flat outer surface, wherein the bushing is formed of a material which expands when compressed during assembly.

11. The bushing of claim 10, wherein the inner wall defining the central hole is not continuous to define at least one split section.

12. The bushing of claim 10, wherein the bushing is formed of plastic.

13. The bushing of claim 10, wherein the flange portion extends radially outward further than the outer wall of the tubular segment.

* * * * *